(12) United States Patent
Boucher (10) Patent No.: US 7,178,002 B2
(45) Date of Patent: Feb. 13, 2007

(54) METHODS AND SYSTEMS FOR DYNAMICALLY GROWING MULTIPLE STACKS

(75) Inventor: Michael L. Boucher, Lafayette, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 461 days.

(21) Appl. No.: 10/202,335

(22) Filed: Jul. 24, 2002

(65) Prior Publication Data

US 2004/0019744 A1    Jan. 29, 2004

(51) Int. Cl.
*G06F 12/00* (2006.01)

(52) U.S. Cl. ........................... 711/170; 711/2; 711/172; 711/173

(58) Field of Classification Search .................... 711/2, 711/170, 171, 172, 173, 132, 154; 712/202; 717/151

See application file for complete search history.

(56) References Cited

U.S. PATENT DOCUMENTS 5,949,973 A * 9/1999 Yarom ........................ 713/200
5,950,221 A * 9/1999 Draves et al. ............... 711/100
6,006,323 A * 12/1999 Ma et al. ..................... 712/202
6,101,580 A * 8/2000 Agesen et al. ............... 711/132
6,618,797 B1* 9/2003 Dery et al. .................. 711/170
6,826,675 B1* 11/2004 Tormey et al. .............. 712/202

FOREIGN PATENT DOCUMENTS

WO    WO 200242911 A2 *   5/2002

* cited by examiner

*Primary Examiner*—Hong Kim
(74) *Attorney, Agent, or Firm*—Sonnenschein Nath & Rosenthal LLP (57) ABSTRACT

An allocation instructions and an extension instructions allow a program to continue to execute even when the program requires more stack space than has been allocated to the program. The methods and systems thereby allow programs to run to completion in more situations than programs running in conventional data processing systems. As a result, the programs avoid wasting computing resources by terminating prematurely, without producing results.

18 Claims, 5 Drawing Sheets

Figure 5 even the current top of the stack. It is the address of this new top of the stack that is used to allocate the new stack frame.

METHODS AND SYSTEMS FOR DYNAMICALLY GROWING MULTIPLE STACKS

FIELD OF THE INVENTION

This invention relates to stack allocation and manipulation for computer programs. In particular, this invention relates to methods and systems for handling stack overflow that would otherwise result in abnormal program termination.

BACKGROUND OF THE INVENTION

A stack is a block of memory that a computer program uses to store data that is "local" to a particular subroutine. As instances of the subroutines are invoked, they allocate, for their data, an area of the stack referred to as a stack frame. Each stack frame has a beginning address (stored in a frame pointer) and an ending address (stored in a stack pointer). The address space between the beginning address and the ending address provides memory that the program uses to store and manipulate its local data.

A program may have more than one stack. In particular, each thread in a program with multiple threads of control may have its own stack. In addition, where there are multiple concurrent invocations of a particular subroutine by the same thread of control, each invocation typically allocates its own stack frame. The most recently allocated stack frame is said to be at the top of the stack, while the first allocated stack frame is said to be at the bottom of the stack.

In the past, stack frames were allocated by setting the beginning address (stored in the frame pointer) of the new stack frame to the memory location immediately following the current top of the stack. Then, the ending address (stored in the stack pointer) was advanced past the current top of the stack by the size of the new stack frame. However, if the ending address of a new stack frame pointed to a portion of memory beyond that allocated for the stack as a whole, then stack overflow occurred. Stack overflow generally resulted in abnormal termination of the program.

Past approaches to handling stack overflow varied from doing nothing or aborting the program to copying the stack or implementing the stack as a linked list. In those approaches where nothing was done, the program was simply allowed to write data beyond the end of its stack and thus overwrite the memory space allocated, as examples, to another program, thread, or operating system table (e.g., an I/O table or global table). Naturally, overwriting the data of other entities commonly lead to incorrect results or complete program failure. In other systems, the program was instead aborted, and the program could not finish the work it had been assigned.

Another attempt to handle stack overflow copied the whole existing stack into an area of memory with sufficient contiguous memory for all the new stack frames. However, such an approach required that the program access its stack data only indirectly (e.g., using a pointer to a pointer) because the address of all the data items in the original stack change upon being copied. Using indirect access resulted in a substantial performance penalty, copying the stack required much more memory than would otherwise be needed, and copying the stack made it much more difficult for threads in a multi-threaded program to share data. Note also that significant amounts of time had to be spent to copy the stack, and that the approach failed even when there was enough available memory in the system for the new stack frame, but that available memory was not located contiguously.

Implementing the stack as a linked list of frames resulted in considerable stack operation overhead for allocation, de-allocation, and maintenance of the linked list. The stack frame could not be rapidly extended to provide responsiveness to special conditions. Furthermore, the linked list approach was more vulnerable to stack overrun and was generally incompatible with established methods of handling the stack. In addition, adding a linked list approach to a system that has already implemented a conventional contiguous allocation technique gives rise to significant incompatibilities.

In other words, stack overflow is a considerable problem for data processing systems. Therefore, a need has long existed for handling stack overflow that overcomes the problems noted above and others previously experienced.

SUMMARY OF THE INVENTION

Methods and systems consistent with the present invention allow a program to continue to execute even when the program requires more stack space than has been initially allocated to a particular thread stack. The methods and systems thereby allow programs to run to completion in typically more situations than programs running in conventional data processing systems. As a result, the programs avoid wasting computing resources by terminating prematurely, without producing results.

According to one aspect of the present invention, such methods and systems, as embodied and broadly described herein, include creating a new stack frame in a stack memory overflow area. The new stack frame is directed into the stack memory overflow area by a temporary placeholder stack frame. The frame pointer and stack pointer that bound the stack frames are manipulated in a manner that is compatible with existing data processing systems. As a result, the methods and systems extend the stack space available to a program without creating hardware and software incompatibilities.

Methods and systems consistent with the present invention overcome the shortcomings of the related art, for example, by allowing a program to continue executing even when its stack space has been exhausted, without incurring undue amounts of overhead or creating hardware and software incompatibilities.

In accordance with methods consistent with the present invention, a method is provided for allocating a new stack frame bounded by a frame pointer and a stack pointer. The method includes establishing a placeholder stack frame on a stack. The placeholder stack frame extends from the stack to an allocated memory block in stack overflow memory. The method then establishes the new stack frame in the allocated memory block for the program.

Also in accordance with methods consistent with the present invention, a method is provided for extending an existing stack frame bounded by a frame pointer and a stack pointer. The method includes setting an allocation reference to point to stack overflow memory area beyond the stack and setting the stack pointer beyond the allocation reference to bound a stack extension for the existing stack frame.

In accordance with systems consistent with the present invention, a data processing system is provided. The data processing system includes a memory comprising stack frame allocation instructions and a stack frame extension instructions. The stack frame allocation instructions allocate a new stack frame bounded by a frame pointer and a stack pointer by establishing a placeholder stack frame that extends from an existing stack to stack overflow memory, and establishes the new stack frame in stack overflow memory. The stack frame extension instructions allocate stack space for an existing stack frame in a memory block allocated in the stack overflow memory. The data processing system also includes a processor that runs the stack frame allocation instructions and the stack extension instructions.

A computer-readable medium is also provided. The computer-readable medium contains instructions that cause a data processing system to perform a method for allocating a new stack frame bounded by a frame pointer and a stack pointer. The method includes establishing a placeholder stack frame that extends from the stack to stack overflow memory, and establishing the new stack frame for the program in the stack overflow memory.

Other apparatus, methods, features and advantages of the present invention will be or will become apparent to one with skill in the art upon examination of the following figures and detailed description. It is intended that all such additional systems, methods, features and advantages be included within this description, be within the scope of the present invention, and be protected by the accompanying drawings.

DETAILED DESCRIPTION OF THE INVENTION

Reference will now be made in detail to an implementation in accordance with methods, systems, and products consistent with the present invention as illustrated in the accompanying drawings. The same reference numbers may be used throughout the drawings and the following description to refer to the same or like parts.

Figure 1:
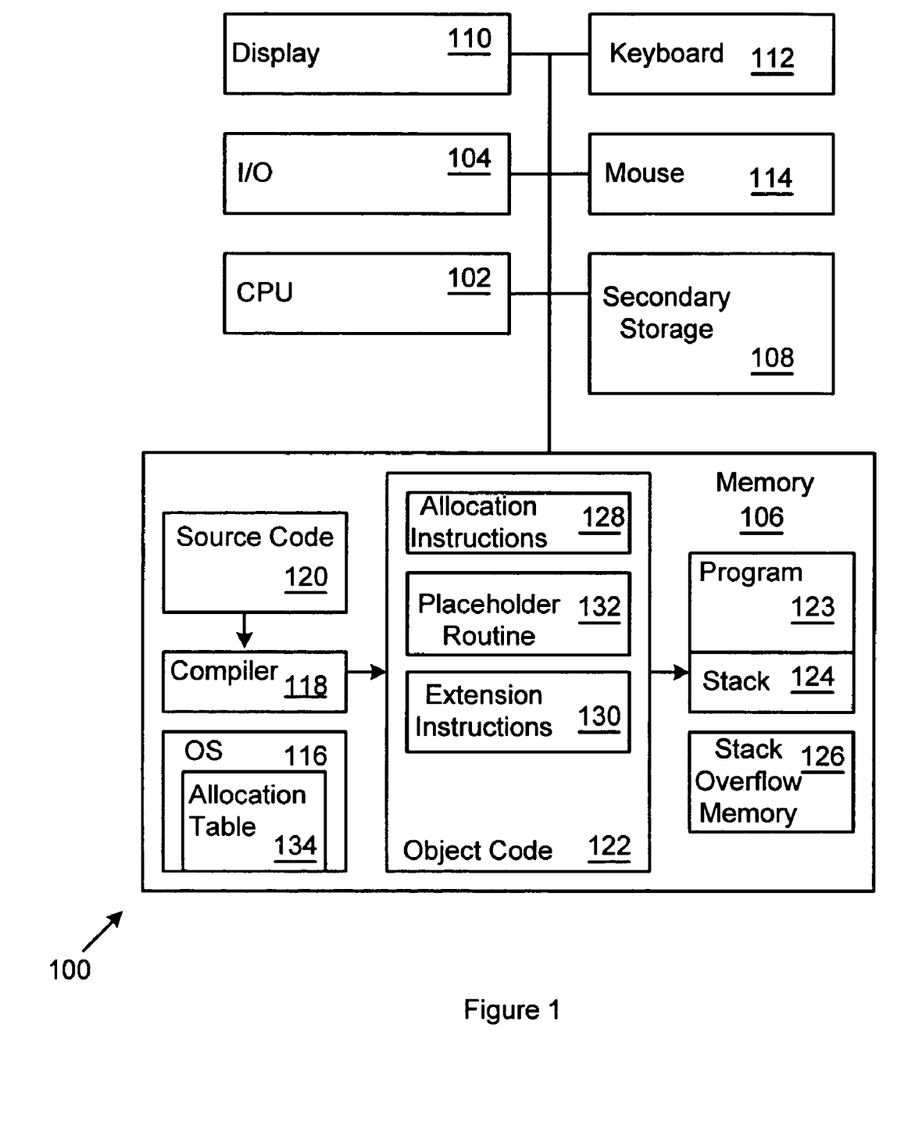
FIG. 1 depicts a block diagram of a data processing system suitable for practicing methods and implementing systems consistent with the present invention.

FIG. 1 depicts a block diagram of a data processing system 100 suitable for practicing methods and implementing systems consistent with the present invention. The data processing system 100 comprises a central processing unit (CPU) 102, an input output I/O unit 104, a memory 106, a secondary storage device 108, and a video display 110. The data processing system 100 may further include input devices such as a keyboard 112, a mouse 114 or a speech processor (not illustrated).

An operating system 116 (e.g., UNIX, Solaris, or the like) runs in the memory 106. A compiler 118 is available to program designers and may be invoked to compile the source code 120. In one embodiment, the compiler 118 adds stack frame allocation and extension instructions (described in detail below) to the source code 120 during compilation. The resulting object code 122 may then be linked and assembled to create the program 123. The program 123, as will be explained below, is less susceptible to abnormal program termination due to stack overflow. Note that for the purposes of discussion below, the program 123 may be an unthreaded program on a system that supports threads, a thread itself, or a program running on a system that does not support threads.

The program 123 uses the stack 124 to store data used by the program 123. A stack overflow memory 126, allocated, as examples, by the operating system 116 when the operating system 116 starts, or when the operating system 116 starts the program, provides additional memory for data that would otherwise overflow the stack 124. During the compilation process, the compiler 120 inserts into the object code 122 (and thus into the program 123) one or more sets of stack frame allocation instructions 128 ("allocation instructions 128"), stack frame extension instructions 130 ("extension instructions 130"), and stack placeholder routines 132. The allocation instructions 128 and extension instructions 130 will use the stack overflow memory 126 to provide additional storage for data that would ordinarily overflow the stack 124.

The allocation instructions 128 and the extension instructions 130 are sequences of instructions that manipulate stack pointers and frame pointers as explained below. In particular, the instructions that implement the allocation instructions 128 and the extension instructions 130 may be incorporated into the program 123 at points where functions or subroutines are called in order to establish stack frames as explained below. Note that in other embodiments, the allocation instructions 128 and extension instructions 130 may be implemented as stand alone programs (e.g., in a support library) called by the program 123, or as extensions to existing functions provided by the operating system 116.

An allocation table 134 accounts for the blocks of memory that are allocated from the stack overflow memory 126. The allocation table 134 provides a list of memory blocks, their size, ownership (e.g., using a thread ID), and reservation status. The allocation table 134 may also store the current top-of-stack of programs that are allocated memory from the stack overflow memory 126.

Although aspects of the present invention are depicted as being stored in memory 106, one skilled in the art will appreciate that all or part of systems and methods consistent with the present invention may be stored on or read from other computer-readable media, for example, secondary storage devices such as hard disks, floppy disks, and CD-ROMs; a signal received from a network such as the Internet; or other forms of ROM or RAM either currently known or later developed. Further, although specific components of data processing system 100 are described, one skilled in the art will appreciate that a data processing system suitable for use with methods, systems, and articles of manufacture consistent with the present invention may contain additional or different components.

Figure 2:
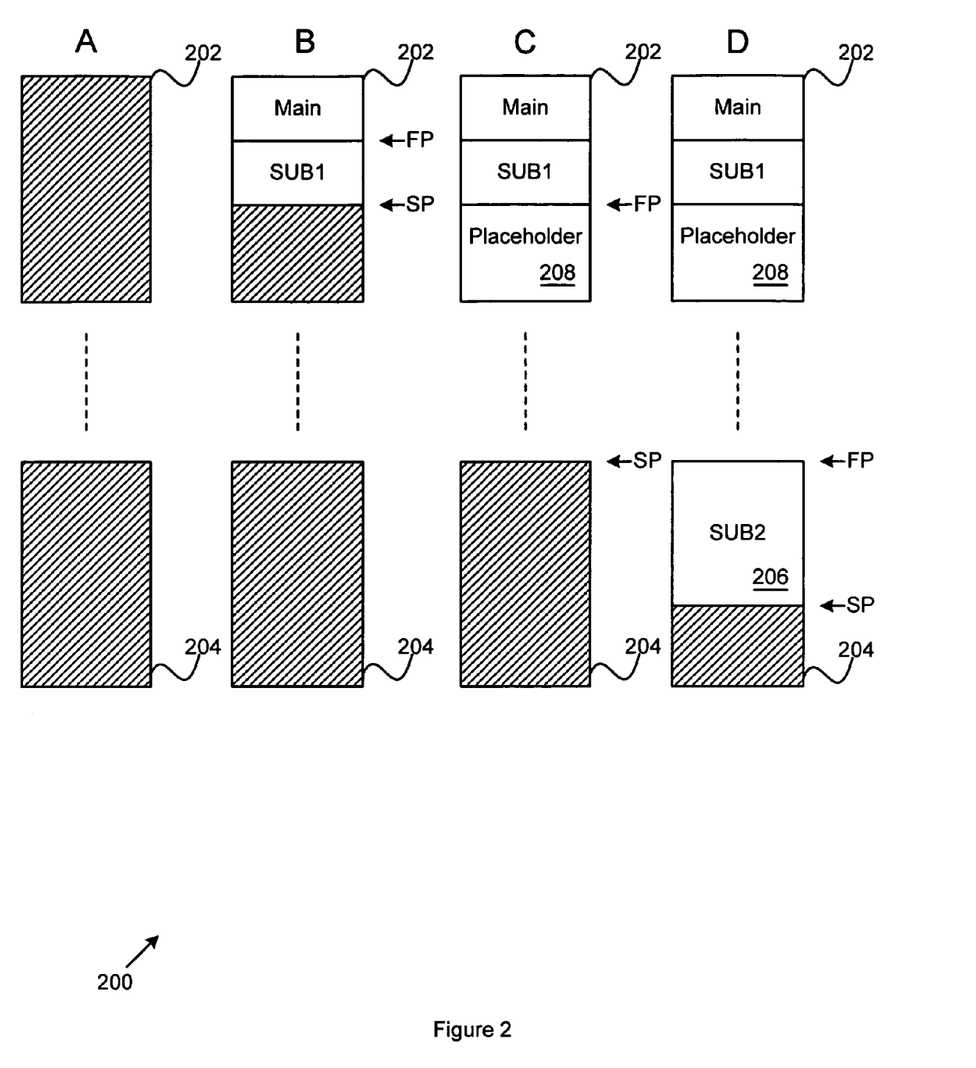
FIG. 2 depicts the establishment of a new stack frame in the memory of the data processing system shown in FIG. 1 for a program running in the data processing system.

Turning next to FIG. 2, that figure depicts a sequence of events leading to the establishment on the stack 202 of a new stack frame in the stack overflow memory area 204. Initially, at point 'A', a new stack 202 has been allocated to the program 123 for data storage. In addition, a stack memory overflow area 204 is shown allocated in the memory 106. The overflow area 204 may be allocated in the direction of stack growth in advance (e.g., by the operating system 116) to provide memory that may be used by any number of programs running in the data processing system 100.

At point 'B', the program 123 has entered its Main routine and called a subroutine SUB1. In response, the allocation instructions 128 have established a stack frame for Main and a stack frame for SUB1. Because the program 123 is currently in SUB1, the frame pointer FP and the stack pointer SP bound the stack frame for SUB1. Thus, the memory between FP and SP is the area of the stack in which SUB1 stores and manipulates at least a portion of its data (e.g., program variables).

In creating a new stack frame, the allocation instructions 128 set the FP ahead of the current value of the SP (which points to the top of the stack), and typically to the next aligned memory address after the SP. The program then sets the SP to point ahead of the FP by an amount of memory needed for the new stack frame.

Because additional subroutines may be called, the existing stack frame for SUB1 may not be the only stack frame that needs to be placed on the stack 202. Assuming, for example, that a second subroutine SUB2 is called from SUB1, then a new stack frame 206 (for SUB2) needs to be established on the stack 202.

However, in the example shown in FIG. 2, the remaining memory in the stack 202 is insufficient to hold the new stack frame 206. Ordinarily, the program 123 would terminate abnormally with a stack overflow error. Instead, however, the allocation instructions 128 recognize that the remaining memory is insufficient (e.g., by checking the amount of memory between the SP and the end of the stack) for the new stack frame 206. In one embodiment, the allocation instructions 128 increment a counter to track the number of times that the remaining memory was insufficient. If the counter exceeds a pre-selected value, then the allocation instructions 128 may generate an interrupt to signal the operating system, debugger, or other program that a particular program is consistently exceeding its stack space. Alternatively, the allocation instructions 128 may set a flag in a global variable, call a reporting subroutine, or the like.

Rather than having the program terminate, the allocation instructions 128 initiate a call to the placeholder subroutine 132. At point 'C', the allocation instructions 128 create a placeholder stack frame 208 for the placeholder subroutine 132 on the stack 202. The placeholder stack frame 208 extends from the stack (generally from the current top of the stack pointed to by the SP) down to overflow memory in the stack overflow memory area 204. The overflow memory may be any memory block available in the stack overflow memory area 204 that is sufficient in size to hold the new stack frame. Note, however, that the placeholder stack frame 208 (like an ordinary stack frame) is still bounded by the FP and SP.

The allocation instructions 128 may determine a suitable memory block (in terms of size and ownership) by searching the allocation table 134. Note that if the program has previously overflowed the stack, then the allocation table 134 will show the address of the stack frame that was allocated for the program previously. If the previous stack frame is large enough for the current needs of the program, the previous stack frame may be reused. For that purpose, the allocation instructions 128 set the FP to the base of the previously used stack frame, and set the SP beyond the FP to encompass enough memory for the current stack needs of the program.

If the previous stack frame is not large enough, then the allocation instructions 128 search the allocation table 134 for a memory block that is large enough, and that is available. A memory block may be available because it is not in use, or because it has been marked conditionally available (most often for memory block allocated to threads). Thus, the allocation instructions 128 may determine whether the thread is still alive (e.g., by querying the operating system using, for example, the pthread_kill or pthread_cancel mechanism available on data processing systems adhering to the IEEE 1003.1 standard). If the thread is no longer alive, then the allocation instructions 128 may allocate the memory block for the program that needs the new stack frame.

Note that if no suitable free memory block is available, then the program 123 is terminated with a stack overflow error.

Unlike conventional stack frames, the placeholder stack frame extends, generally, over memory that does not belong to the stack 202 or the program 123. However, the placeholder subroutine 132 does not manipulate those areas of memory (e.g., by storing variables). Instead, the placeholder subroutine 132 (using the allocation instructions 128) sets up the placeholder stack frame 208, then calls subroutine SUB2.

At point 'D', the allocation instructions 128 create the new stack frame 206 for the subroutine SUB2. The new stack frame 206, however, is created in the stack overflow memory area 204. The allocation instructions 128 create the new stack frame 206 by setting the FP beyond the SP. The FP, however, is directed by the placeholder stack frame 208 to point to the stack overflow memory area 204, and, more particularly, to a memory block that is large enough to hold the new stack frame 206. Additionally, the allocation instructions 128 set the SP ahead of the FP by the amount of memory needed for the new stack frame 206. Because the overflow memory area 206 is sufficient in size to hold the new stack frame 206, no overflow occurs, and the program 123 continues to execute.

When the subroutine SUB2 finishes executing, program control returns to the placeholder subroutine. In preparation for the return, upon exiting, the allocation instructions 128 restore FP and SP to bound the placeholder stack frame 208. The placeholder subroutine then exits, and program control returns to the subroutine SUB1. As a result, upon exiting, the FP and SP are restored to bound the stack frame for SUB1 as it existed on the stack 202 before the placeholder stack frame 208 was established.

Because the allocation instructions 128 followed the convention of bounding the stack frames using FP and SP, the restoration of the FP and SP may also occur according to convention. In other words, no incompatibilities are introduced by the allocation instructions 128. Optionally, the allocation instructions 128 may install a cleanup handler that receives control if the program or thread that needed the new stack frame is terminated. For example, the pthread_cleanup_push mechanism may be used as the cleanup handler on data processing systems that conform to the IEEE 1003.1 (POSIX.1c) standard.

The extension instructions 130 work in conjunction with the allocation instructions 128. In particular, there are instances in which a subroutine, for example, needs to extend its stack frame (as opposed to calling another subroutine that allocates its own stack frame) to provide additional data storage for the subroutine. In those cases, the extension instructions 130 handle extending an existing stack frame so that overflow does not occur.

Figure 3:
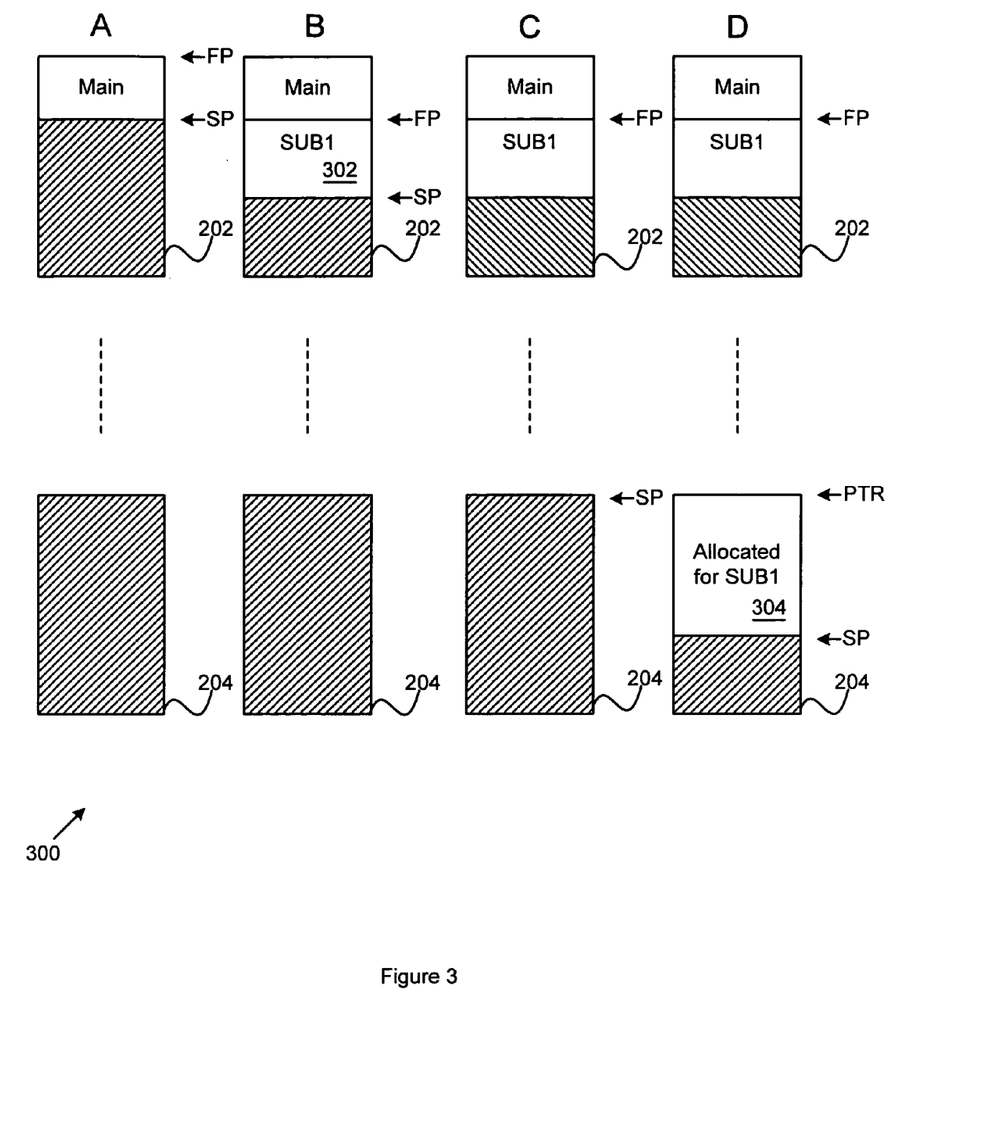
FIG. 3 depicts the extension of an existing stack frame in the memory of the data processing system shown in FIG. 1 for a program running in the data processing system.

The operation of the extension instructions 130 is shown in FIG. 3. FIG. 3 illustrates the stack 202 and the stack memory overflow area 204. At point 'A', the allocation instructions 128 have established a stack frame for the Main subroutine, bounded by the FP and the SP. At point 'B' the program 123 has initiated execution of the subroutine SUB1 and the allocation instructions 128 have established the stack frame 302 for SUB1.

It is next assumed that the subroutine SUB1 needs to allocate additional storage space on the stack for its data. To that end, SUB1 may attempt to extend its stack frame 302 using a stack memory allocation routine provided by the operating system 116. For example, SUB1 may call the allocao routine provided by programming languages supported by UNIX or Solarus. The allocao function accepts an allocation request amount as a parameter and attempts to return a pointer to a block of memory in the stack that provides the requested storage. Conventionally, the call to alloca( ) fails when the remaining memory in the stack is insufficient to meet the allocation request.

The extension instructions 130, however, make use of the stack memory overflow area 204 to provide the requested storage space. In particular, when the extension instructions 130 determine that the remaining stack space in the stack 202 is insufficient to meet the allocation request, the extension instructions 130 then allocate a memory block 304 from the stack overflow memory area 204 in accordance with the allocation request amount. To that end, the extension instructions 130 may consult the allocation table 134 as described above in the discussion of the allocation instructions 126. An allocation reference, (e.g., the pointer PTR), is set to point to the beginning of the allocated memory block 304, and the SP is moved to the end of the allocated memory block 304. The allocated memory block 304 thus forms an extension to the stack frame 302. The extension instructions 130 then return the allocation reference to the subroutine that made the allocation request.

In some implementations, the stack frame extension instructions 130 may first set the SP to the stack memory overflow area 204, then call the alloca( ) function. The call to alloca( ) may then proceed to allocate the memory block in the stack memory overflow area 204 and return the allocation reference to the program. Note that the stack frame extension instructions 130 may extend and replace the functionality of an existing function call (e.g., alloca( )), may be incorporated into a subroutine (e.g., SUB1) in the program 123, or may be implemented as a separate stand alone function call.

Figure 4:
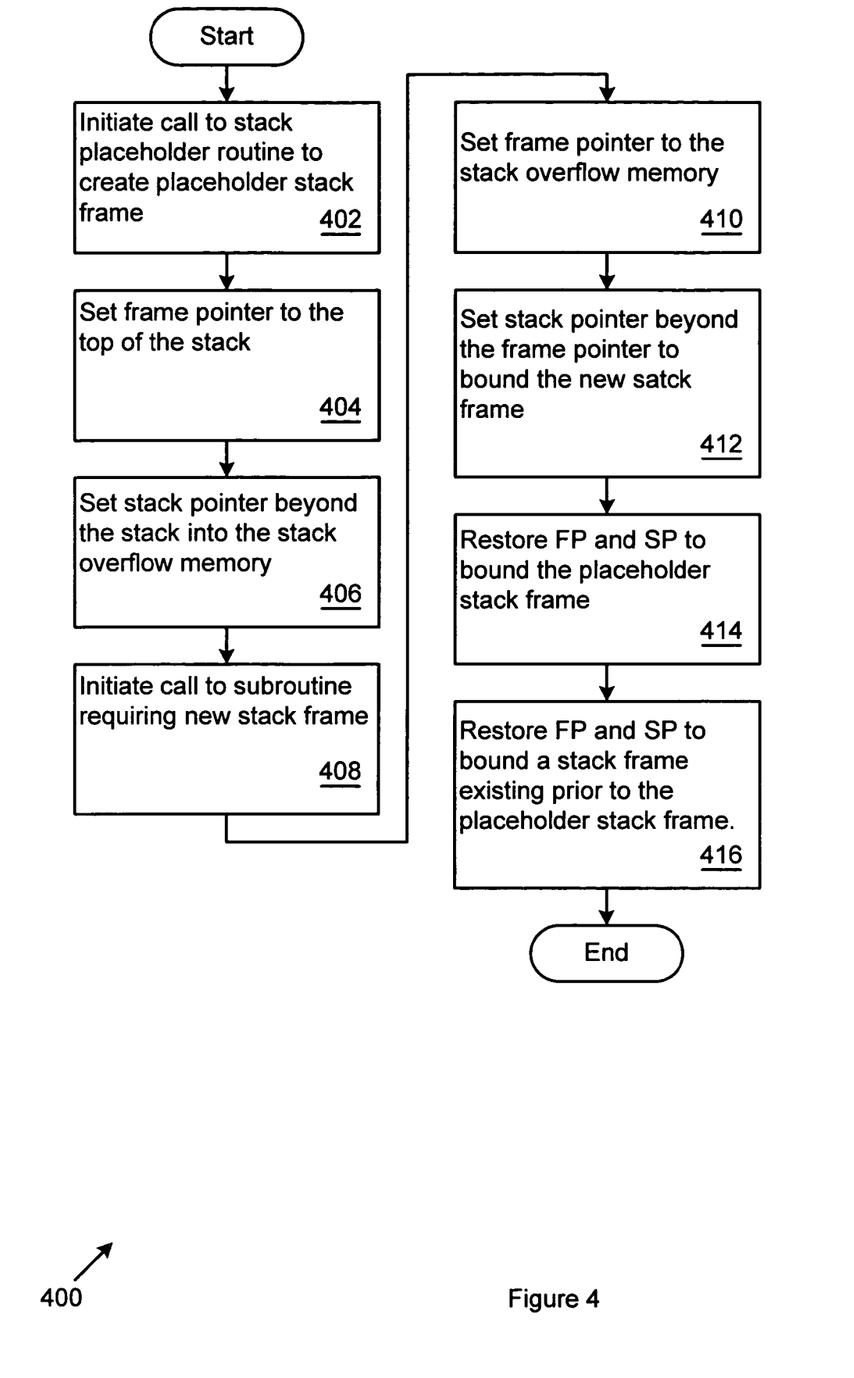
FIG. 4 depicts a flow diagram of the steps taken by a program running in the memory of the data processing system shown in FIG. 1 to establish a new stack frame.

FIG. 4 provides a flow diagram of the allocation and de-allocation of a new stack frame. The allocation instructions 128 initiate a call to a stack placeholder subroutine (step 402). The allocation instructions 128, in response, establishe a placeholder stack frame 208 on the stack 202 by setting the FP to the top of the stack (step 404) and setting the SP beyond the stack into the stack overflow memory area 204 (step 406).

Subsequently, the stack placeholder subroutine initiates a call to the subroutine (e.g., SUB2) for which the new stack frame 206 is being created (step 408). The allocation instructions 128 establishes the new stack frame by setting the FP to point to the overflow memory area 204 (step 410) and setting the SP beyond the FP to bound the new stack frame 206 (step 412). The new stack frame 206 is thereby allocated (and the program 123 continues to execute) even though the stack 202 itself does not have sufficient room for the new stack frame 206.

When the subroutine (e.g., SUB2) using the new stack frame 206 completes, the FP and SP are restored to bound the placeholder stack frame 208 (step 414). The stack placeholder subroutine then exits, and the FP and SP are restored to bound a stack frame existing on the stack (e.g., in the example of FIG. 2, the stack frame for SUB1) prior to the execution of the stack placeholder subroutine (step 416).

Figure 5:
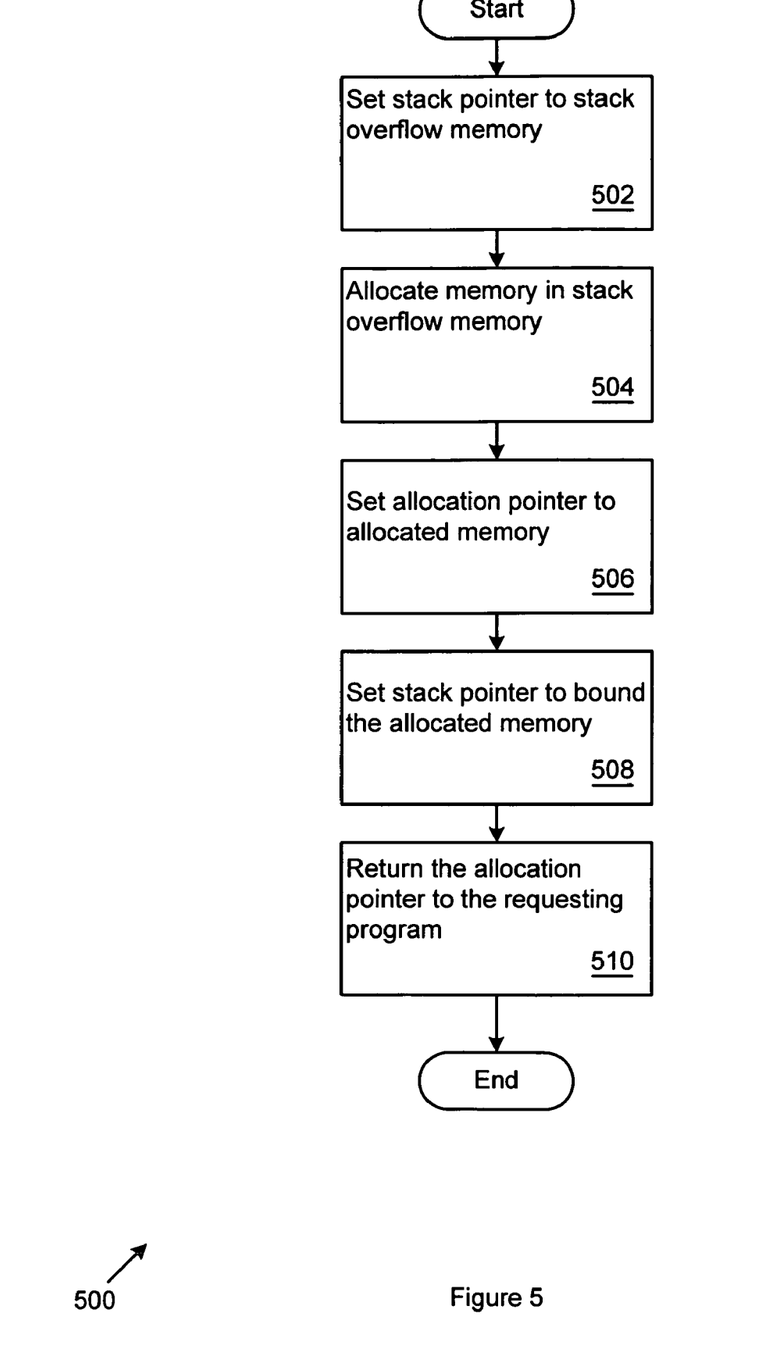
FIG. 5 depicts a flow diagram of the steps taken by a program running in the memory of the data processing system shown in FIG. 1 to extend an existing stack frame.

FIG. 5 provides a flow diagram of the steps taken to extend an existing stack frame. The SP is optionally set to point to the stack overflow memory area 205 (step 502). The extension instructions 130 allocate a memory block in the stack overflow memory area 204 (step 504) and an allocation reference (e.g., PTR in FIG. 3) is set to point to the allocated memory block (step 506). The SP is then advanced to point to the end of the allocated memory block (step 508) and the allocation reference is returned to the requesting program (step 510). As a result, the requesting program may use the allocated memory block to extend its existing stack frame.

Note that both the extension instructions 130 and the stack frame allocation instructions 128 use the SP and FP to bound stack frames in a manner compatible with the commonly accepted techniques for building and tearing down stack frames. In other words, the extension instructions 130 and the allocation instructions 128 not only allow a program to avoid, in many instances, abnormal termination due to stack overflow, but do so in a manner that is compatible with existing calling and restoring conventions, software tools, and the like.

Note also that the allocation instructions 128 and the extension instructions 130 may gather statistics on each instance in which a stack frame is allocated or extended into the overflow memory 204. The statistics may include, as examples, how much additional memory was needed to accommodate the new stack frame or extension, what sequence of subroutine calls gave rise to the need for the need to use the overflow memory 204, and how many times a particular thread has needed to use the overflow memory 204. As a result, the allocation instructions 128 and extension instructions 130 may provide the statistics to the program designer as an aid to understanding how often and how much additional stack space was needed, by which programs and threads, and what sequences of program calls lead to the need for additional stack space.

The allocation instructions 128 and extension instructions 130 may further adapt to the repeated need for additional stack space. For example, if the extension instructions 130 tracks a pre-selected number of repeated requests for an amount of additional stack space, the extension instructions 130 may, on the next request, instead allocate additional stack space beyond the requested amount (e.g., a multiple of the requested additional stack space). Thus, the extension instructions 130 may help a program avoid the overhead of multiple calls to the extension instructions 130.

Note that in an alternate embodiment, the compiler does not add the stack frame allocation instructions 128 to the object code. Rather, the compiler may instead add instructions in the object code that touch (e.g., initiate a memory read from) each page of memory in the stack frame after each new stack frame is allocated, and add instructions in the object code to specify a memory access exception handler. When the program 123 exceeds its stack space, the most recently allocated stack frame will intrude into an out of bounds memory page. As a result, the operating system 116 will raise a memory exception when the out of bounds memory page is touched. The exception handler may be provided in a support library, for example, and include the stack frame allocation instructions 128. When it catches the memory exception, the exception handler may then perform the stack frame allocation as explained above, and return control to the program 123. Note that in general, the sequences of instructions may be implemented with compiler generated code, code imported from libraries, code generated at run-time, or instructions added to the execution stream by other means.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. Note also that the implementation may vary between systems. The invention may be implemented with both object-oriented and non-object-oriented programming systems. The claims and their equivalents define the scope of the invention.

What is claimed is:

1. A method in a data processing system for extending an existing stack frame on a stack into a stack overflow memory, which is external to the stack, the existing stack frame bounded by a frame pointer and a stack pointer, the frame pointer identifying a first memory location of the stack frame and the stack pointer identifying a last memory location of the stack frame, the method comprising the steps of:
    allocating a memory block in the stack overflow memory;
    setting the stack pointer to point to the start of the memory block;
    after setting the stack pointer to point to the start of the memory block, setting an allocation reference to point to the start of the memory block;
    after setting the allocation reference, setting the stack pointer beyond the allocation reference to create an extension for the existing stack frame; and
    gathering statistics on the creation of the extension, wherein the statistics comprise a number of times the extension is created.

2. The method of claim 1, further comprising the step of specifying an allocation request amount, and wherein the step of setting the stack pointer beyond the allocation reference comprises the step of setting the stack pointer ahead of the extension pointer by the allocation request amount.

3. The method of claim 1, further comprising the step of initiating a call from a requesting program to a stack memory allocation instructions.

4. The method of claim 3, further comprising the step of returning the allocation reference to the requesting program.

5. The method of claim 1, wherein the step of allocating the memory block comprises the step of searching an allocation table for free memory.

6. The method of claim 1, further comprising the step of specifying an allocation request amount, and wherein the memory block is characterized by a beginning address, and the step of setting the allocation reference comprises the step of setting the allocation reference to the beginning address, and wherein the step of setting the stack pointer beyond the allocation reference comprises the step of setting the stack pointer beyond the beginning address by more than the allocation request amount.

7. The method of claim 1, wherein the statistics comprise a size for the extension.

8. The method of claim 1, further comprising the step of specifying an allocation request amount, and wherein the step of setting the stack pointer beyond the allocation reference comprises the step of setting the stack pointer beyond the allocation reference by the more than the allocation request amount when the number of times the extension is created exceeds a pre-selected threshold.

9. A method in a data processing system for allocating storage space for a subroutine using a stack, the method comprising the steps of:
    determining when the stack lacks sufficient space to hold a new stack frame, and, in response:
        establishing a placeholder stack frame on the stack, the placeholder stack frame consisting of contiguous and uninterrupted memory locations extending from a memory location immediately subsequent to an existing stack frame on the stack to a memory location immediately prior to the new stack frame in the stack overflow memory, which is external to the stack, the new stack frame being separated from the stack by a plurality of memory locations; and
        establishing the new stack frame in the stack overflow memory; and
    initiating a stack memory allocation request to extend an existing stack frame bounded by a frame pointer and a stack pointer;
    determining when the stack lacks sufficient space to meet the stack memory allocation request, and, in response:
        setting the stack pointer to point to the stack overflow memory;
        allocating a memory block in the stack overflow memory;
        setting an allocation reference to point to the memory block; and
        setting the stack pointer beyond the allocation reference to create an extension to meet the stack memory allocation request.

10. The method of claim 9, wherein the step of establishing a placeholder stack frame comprises the step of establishing the placeholder stack frame between a top of the stack and the stack overflow memory.

11. The method of claim 9, wherein the initiating step comprises the step of initiating a call to a stack memory allocation instructions that specifies the stack memory allocation request.

12. A data processing system for compiling a program that uses a stack and that comprises source code instructions, the data processing system comprising:
    a memory comprising a compiler and the source code instructions, the compiler adding stack frame allocation instructions during compilation of the source code instructions, the stack frame allocation instructions for establishing a placeholder stack frame on the stack, the placeholder stack frame consisting of contiguous and uninterrupted memory locations extending from a memory location immediately subsequent to an existing stack frame on the stack to a memory location immediately prior to the new stack frame in the stack overflow memory, which is external to the stack, the new stack frame being separated from the stack by a plurality of memory locations, and establishing the new stack frame for the program in the stack overflow memory, the compiler further adding stack extension instructions during compilation of the source code instructions, the stack extension instructions for extending an existing stack frame on the stack into the stack overflow memory, the existing stack frame bounded by a frame pointer and a stack pointer, by allocating a memory block in the stack overflow memory, setting an allocation reference to point to the memory block, and setting the stack pointer beyond the allocation reference to create an extension for the existing stack frame; and a processor that runs the compiler.

13. The data processing system of claim 12, wherein the compiler further adds instructions for restoring the frame pointer and the stack pointer to bound the placeholder stack frame.

14. The data processing system of claim 12, wherein the compiler further adds instructions for restoring the frame pointer and the stack pointer to bound a pre-existing stack frame on the stack before the placeholder stack frame.

15. The data processing system of claim 12, wherein the compiler further adds instructions for allocating a memory block in the stack overflow memory.

16. The data processing system of claim 15, wherein the compiler further adds instructions for initiating a call to a stack placeholder subroutine.

17. The data processing system of claim 16, wherein the compiler further adds instructions for searching an allocation table for the memory block.

18. The data processing system of claim 12 wherein the source code instructions specify an allocation request amount, and wherein the instructions for setting the stack pointer beyond the allocation reference comprise instructions for setting the stack pointer beyond the allocation reference by the allocation request amount.

* * * * *